(12) United States Patent
Enstedt et al.

(10) Patent No.: US 9,348,059 B2
(45) Date of Patent: May 24, 2016

(54) FAST MODELING USING INTERPOLATED STARTING POINTS

(71) Applicant: PGS Geophysical AS, Lysaker (NO)

(72) Inventors: Mattias Enstedt, Uppsala (SE); Joel Skogman, Jarfalla (SE); Leif Abrahamsson, Uppsala (SE)

(73) Assignee: PGS Geophysical AS, Oslo (NO)

( * ) Notice: Subject to any disclaimer, the term of this patent is extended or adjusted under 35 U.S.C. 154(b) by 507 days.

(21) Appl. No.: 13/953,244

(22) Filed: Jul. 29, 2013

(65) Prior Publication Data

US 2014/0359265 A1    Dec. 4, 2014

Related U.S. Application Data

(60) Provisional application No. 61/830,554, filed on Jun. 3, 2013.

(51) Int. Cl.
| | |
|---|---|
| *G06G 7/48* | (2006.01) |
| *G01V 99/00* | (2009.01) |
| *G01V 3/12* | (2006.01) |
| *E21B 43/20* | (2006.01) |
| *G01V 7/00* | (2006.01) |

(52) U.S. Cl.
CPC ............ *G01V 99/005* (2013.01); *E21B 43/20* (2013.01); *G01V 3/12* (2013.01); *G01V 7/00* (2013.01)

(58) Field of Classification Search
CPC ......... G01V 99/005; G01V 3/12; G01V 7/00; E21B 43/20
See application file for complete search history.

(56) References Cited

U.S. PATENT DOCUMENTS

| | | | |
|---|---|---|---|
| 7,286,939 B2 | 10/2007 | Bachrach et al. | |
| 7,808,420 B2 | 10/2010 | Carazzone | |
| 2009/0006053 A1* | 1/2009 | Carazzone | G01V 3/12 703/5 |
| 2010/0004906 A1* | 1/2010 | Searles | E21B 43/20 703/2 |
| 2012/0232871 A1* | 9/2012 | Priezzhev | G01V 7/00 703/10 |
| 2013/0138346 A1 | 5/2013 | Mattsson | |

FOREIGN PATENT DOCUMENTS

| | | |
|---|---|---|
| EP | 2389602 | 11/2011 |
| WO | 2011/115921 | 9/2011 |
| WO | 2012/122503 | 9/2012 |

* cited by examiner

*Primary Examiner* — Kandasamy Thangavelu
(74) *Attorney, Agent, or Firm* — Meyertons, Hood, Kivlin, Kowert & Goetzel, P.C (57) ABSTRACT

Techniques are disclosed relating to forward and inverse modeling of geophysical formations using interpolation. In one embodiment, a method includes generating a system of equations based on a background model that describes a geophysical formation. In this embodiment, the method also includes generating a first set of solutions for the system of equations using an initial set of base points from geophysical survey data obtained from the geophysical formation and interpolating, using the first set of solutions, to produce a set of solution approximations for a second set of data points from the geophysical survey data. In this embodiment, the method also includes generating a model of the geophysical formation, using the second set of data points and the set of solution approximations, where the model includes a second set of solutions for the system of equations.

22 Claims, 6 Drawing Sheets

Survey Grid 300

FIG. 3A

Survey Parameters 350

| Sensors | |
|---|---|
| Sensor Spacing 200m — 1000m — shot | |
| Offset | 1000:200:2800 |
| Depth | 100 m |

| Source | |
|---|---|
| F | 0.1:0.025:1 Hz |
| Strength | 1 Am |
| Length | 10 m |
| Depth | 0 m |

| Cellsize (x,y,z) |
|---|
| (20,20,25) m |

| Number of cells (#x,#y,#z) |
|---|
| (100,100,2) m |

FAST MODELING USING INTERPOLATED STARTING POINTS

This application claims priority to U.S. Provisional Appl. No. 61/830,554, filed Jun. 3, 2013, which is incorporated by reference herein in its entirety.

BACKGROUND

Geophysical surveys are often used for oil and gas exploration in geophysical formations, which may be located below marine environments. Various types of signal sources and sensors may be used in different types of geophysical surveys. For example, electromagnetic (EM) surveys may be conducted using EM signals transmitted by an EM source and detected by EM sensors. Thus, for example, an EM source may create an electric field and the EM sensors may measure an induced electric field in a geophysical formation. Measured EM data may be used to determine where mineral reservoirs may be located in the geophysical formation. As another example survey type, seismic geophysical surveys are based on the use of acoustic waves. In such a survey, a vessel may tow an acoustic source (e.g., an air gun or a marine vibrator) and a plurality of streamers along which a number of acoustic sensors (e.g., hydrophones or geophones) are located. Acoustic waves generated by the source may then be transmitted to the earth's crust and then reflected back and captured at the sensors. Acoustic waves received during a marine seismic survey may be analyzed to locate hydrocarbon-bearing geological structures, and thus determine where deposits of oil and natural gas may be located.

Geophysical survey data may be taken in a plurality of dimensions, including different shot points (e.g., of an array sensors relative to a source) and source frequencies, for example. Further, models of geophysical strata may include various model parameters such as conductivity, porosity, saturation, etc. Interpreting seismic data may include forward modeling which may involve selecting a set of model parameters and solving a system of equations with the selected model parameters using obtained geophysical data. Inverse modeling may involve solving similar systems of equations using different model parameters to determine which model parameters best match the geophysical data. Thus, in inverse modeling, the model parameters may be considered an additional dimension to the modeling problem.

Solving systems of equations may be computationally intensive, especially for inverse modeling problems.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

DETAILED DESCRIPTION

The present disclosure describes techniques for forward and inverse modeling of geophysical survey data using interpolated starting points. For example, marine geophysical prospecting may involve modeling underwater geophysical formations. In some embodiments, modeling is performed using the integral equation method. The disclosed techniques may, in some embodiments, result in improved modeling of geophysical data, including more accurate survey predictions and/or more efficient data processing. Thereby, the disclosed techniques may, in some embodiments, provide better opportunities for identifying hydrocarbons for production from subsurface formations.

Figure 1:
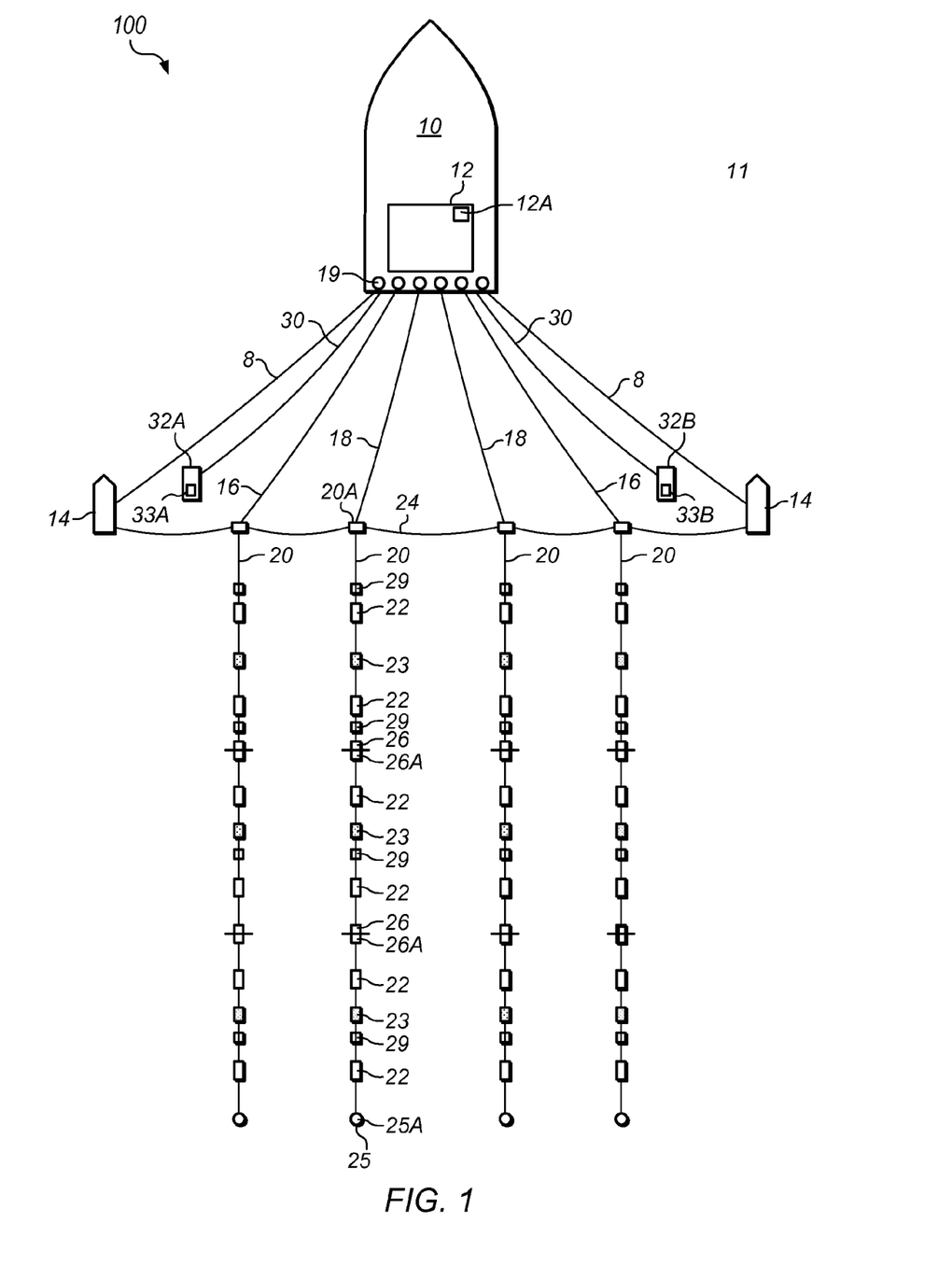
FIG. 1 is a block diagram illustrating one embodiment of a geophysical survey system.
Figure 2:
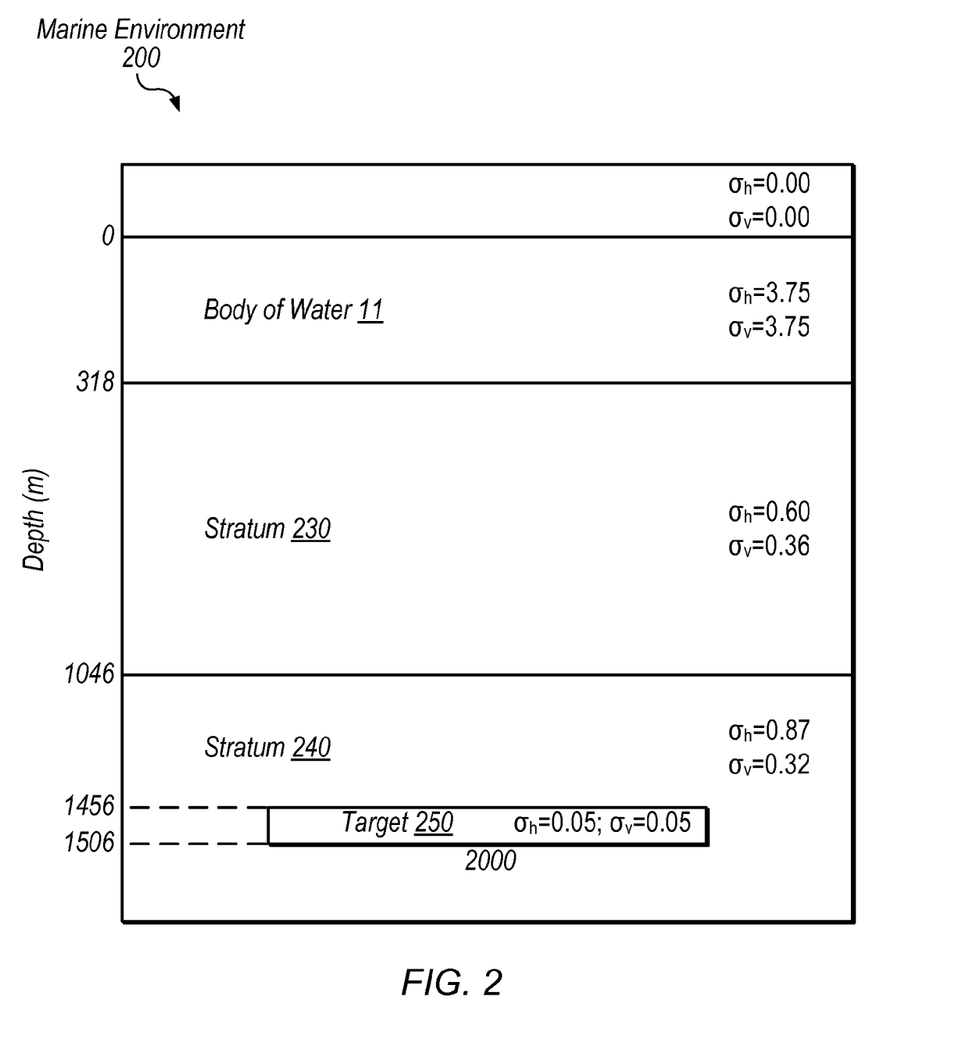
FIG. 2 is a diagram illustrating an exemplary marine environment.
Figure 3A:
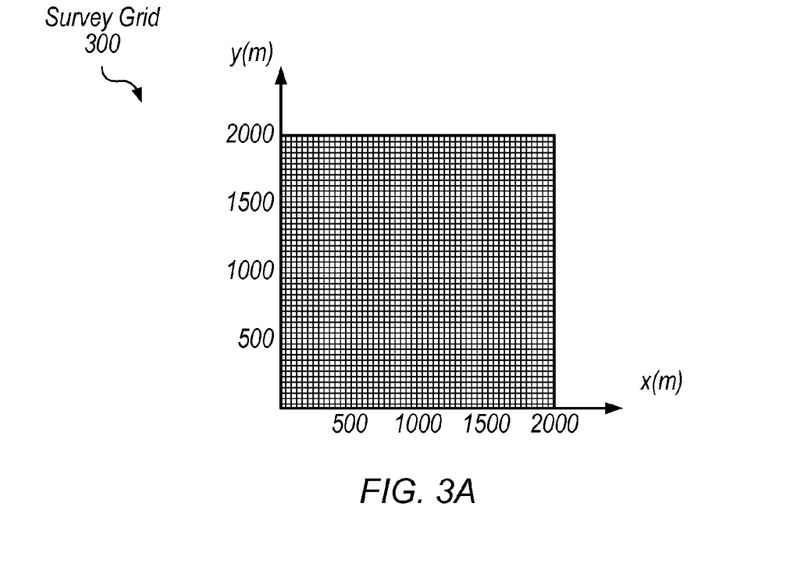
FIG. 3A is a diagram illustrating an exemplary survey grid.
Figure 3B:
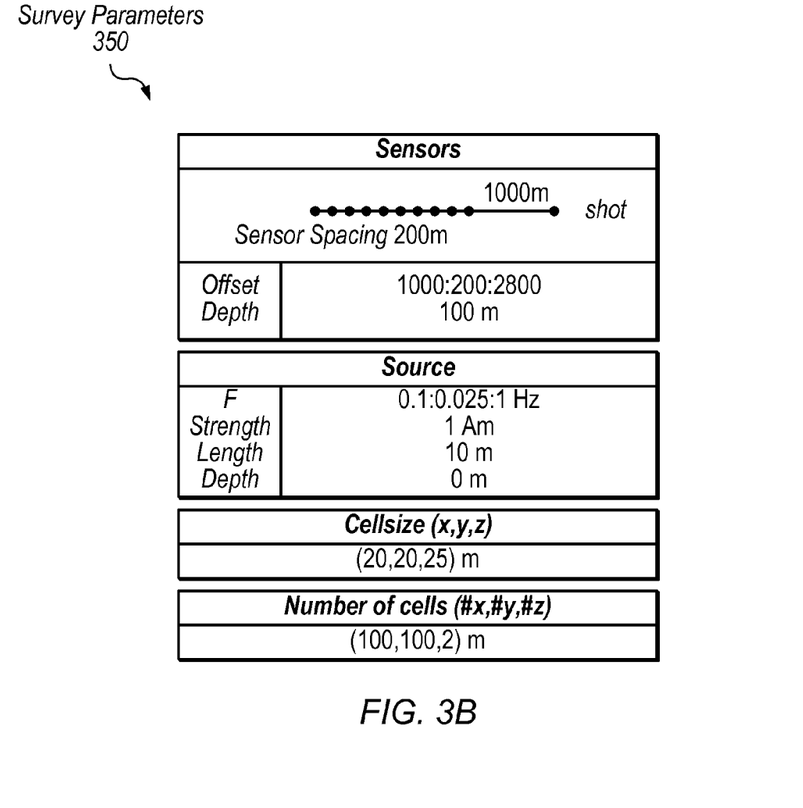
FIG. 3B is a diagram illustrating exemplary survey parameters.
Figure 4:
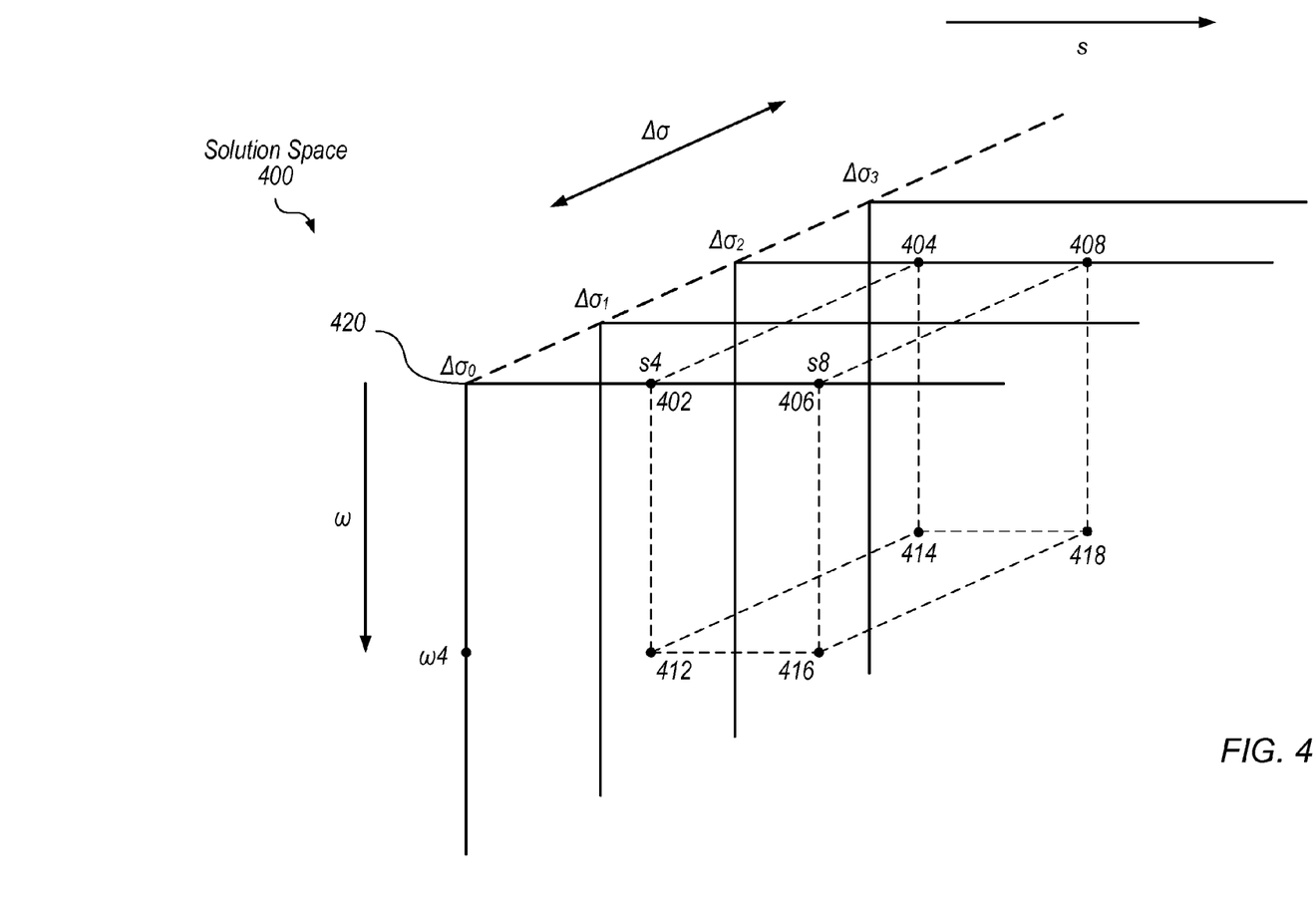
FIG. 4 is a diagram illustrating an exemplary solution space for an electromagnetic survey.
Figure 5:
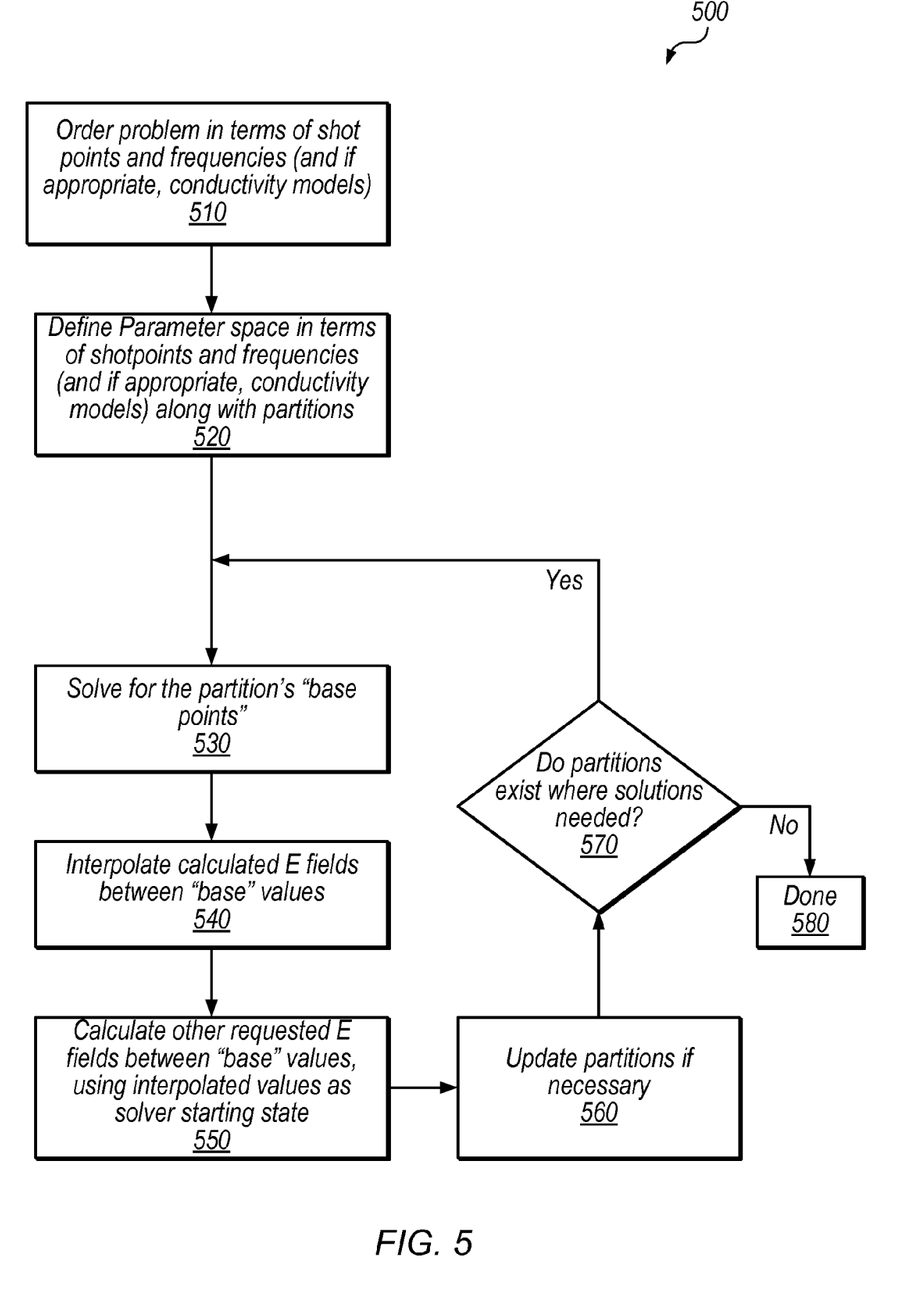
FIG. 5 is a flow diagram illustrating a method for modeling using electromagnetic survey data.
Figure 6:
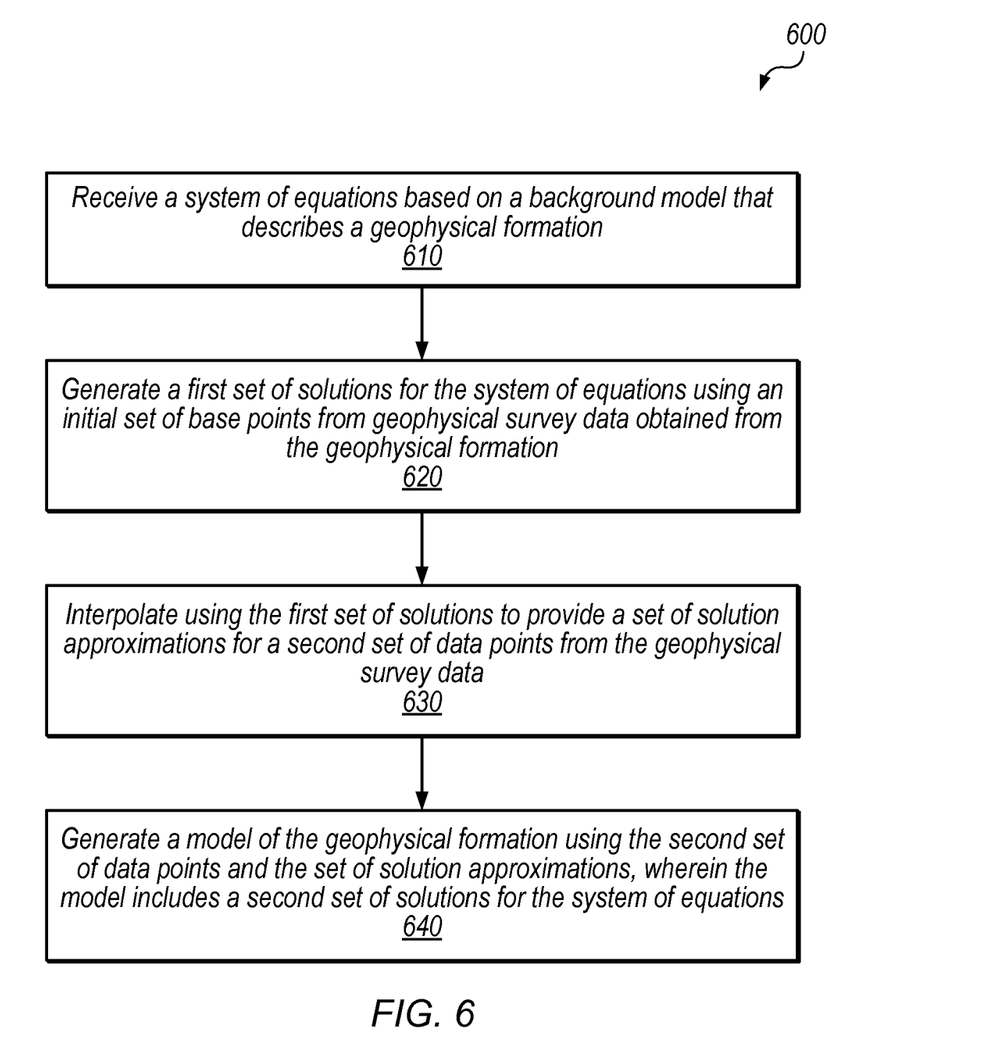
FIG. 6 is a flow diagram illustrating a method for modeling a geophysical formation.

This disclosure may have applications in electromagnetic (EM) exploration and seismic exploration, as well as other areas such as seismoelectric surveys and gravity surveys, for example. FIG. 1 illustrates an exemplary marine survey system while FIGS. 2 and 3A-3B illustrate an exemplary survey environment and survey parameters. FIG. 4 shows an exemplary solution space for an EM survey. FIGS. 5-6 illustrate embodiments of methods for modeling using interpolated starting points.

Referring to FIG. 1, a block diagram illustrating one embodiment of a geophysical survey system 100 is shown. In the illustrated embodiment, system 100 includes vessel 10, signal sources 32A-B, paravanes 14, and streamers 20.

Survey vessel 10 may be configured to move along the surface of body of water 11 such as a lake or the ocean. In the illustrated embodiment, survey vessel 10 tows streamers 20, signal source modules 32, and paravanes 14. In other embodiments, streamers 20 may be towed by a second survey vessel (not shown), rather than or in addition to survey vessel 10. Survey vessel 10 may include equipment, shown generally at 12 and for convenience collectively referred to as "survey equipment." Survey equipment 12 may include devices such as a data recording unit (not shown separately) for making a record with respect to time of signals generated by various sensors in the acquisition system. Survey equipment 12 may also include navigation equipment (not shown separately), which may be configured to control, determine, and record, at selected times, the geodetic positions of: survey vessel 10, each of a plurality of geophysical sensors 22 disposed at spaced-apart locations on streamers 20, and/or signal source modules 32. Geodetic position may be determined using various devices, including global navigation satellite systems such as the global positioning system (GPS), for example. In the illustrated embodiment, survey vessel 10 includes geodetic positioning device 12A and signal sources 32A and 32B respectively include geodetic positioning devices 33A and 33B.

In the survey system shown in FIG. 1, survey vessel 10 tows two signal sources 32A-B. In various embodiments, survey vessel 10 may tow any appropriate number of signal sources, including as few as none or as many as 6 or more. The location of the signal sources may be centered behind survey vessel 10 or displaced from the center line, and may be at various distances relative to survey vessel 10, including attached to the hull. Signal sources 32A and 32B may be any type of signal source known in the art. Each signal source module 32 may include an array of multiple signal sources. For example, signal source 32A may include a plurality of air guns or EM sources. The term "signal source" may refer to a single signal source or to an array of signal sources. In various embodiments, a survey system may include any appropriate number of towed signal source modules 32. In the illustrated embodiment, signal source modules 32 are each coupled to survey vessel 10 at one end through winch 19 or a similar spooling device that enables changing the deployed length of each signal source cable 30. Survey equipment 12 may include signal source control equipment (not shown separately) for selectively operating and maneuvering signal source modules 32.

Geophysical sensors 22 on streamers 20 may be any type of geophysical sensor known in the art. In other embodiments, geophysical sensors for marine surveys may be located on ocean bottom cables or nodes, and/or elsewhere in a survey environment. Non-limiting examples of such sensors may include particle-motion-responsive seismic sensors such as geophones and accelerometers, pressure-responsive seismic sensors such as hydrophones, pressure-time-gradient-responsive seismic sensors, electrodes, magnetometers, temperature sensors or combinations of the foregoing. In various implementations of the disclosure, geophysical sensors 22 may measure, for example, seismic or electromagnetic field energy indicative of the response of various structures in the Earth's subsurface formation below the bottom of body of water 11 in response to energy imparted into the subsurface formation by one or more of signal source modules 32. Seismic energy, for example, may originate from signal source modules 32, or an array of such sources, deployed in body of water 11 and towed by survey vessel 10. A wire loop or electrode pair may be used to impart electromagnetic energy, for example.

In the survey system shown in FIG. 1, survey vessel 10 tows four sensor streamers 20. In various embodiments, survey vessel 10 may tow any appropriate number of sensor streamers, including as few as none or as many as 26 or more. In marine geophysical acquisition systems such as shown in FIG. 1 that include a plurality of laterally spaced-apart streamers, streamers 20 are typically coupled to towing equipment that secures the forward end of each of streamers 20 at a selected lateral position with respect to adjacent streamers and with respect to survey vessel 10. For example, as shown in FIG. 1, the towing equipment may include two paravanes 14 coupled to survey vessel 10 via paravane tow ropes 8. In the illustrated embodiment, paravanes 14 are the outermost components in the streamer spread and may be used to provide lateral streamer separation.

Survey equipment 12, in one embodiment, includes a computing system (not shown separately) for processing data from geophysical sensors 22. In other embodiments, a computing system at another location may process stored geophysical data gathered by survey system 100 (e.g., on land after a survey has been conducted). A computing system may include or be configured to access a non-transitory storage medium having instructions stored thereon that are executable to perform various operations described herein. Modeling geophysical formations using geophysical data may be computationally intensive. Geophysical data may have multiple dimensions such as different source frequencies, shot points (e.g., each geophysical sensor 22 may be a different distance from a signal source), etc. Thus, determining model parameters and solutions may require consideration of various systems of equations having variables based on these dimensions.

FIGS. 2-3B are primarily directed to an exemplary EM survey in which a signal source generates a primary electric field f and sensors measure induced electric fields in cells of a target area (e.g., the magnitude of the induced field and/or its ratio to the primary field). In other embodiments, other types of surveys may be used to generate geophysical data. The techniques disclosed herein with reference to EM surveys may be used for other types of surveys in various embodiments.

Referring now to FIG. 2, a diagram illustrating an exemplary marine environment is shown. The illustrated environment includes a cross-sectional view of body of water 11, which is situated above a geophysical formation that includes stratum 230 and stratum 240, which contains target 250. This environment may be described as horizontally layered. Target 250 may, in some situations, include a portion of a reservoir which may contain oil or gas, for example.

As discussed above with reference to FIG. 1, survey vessel 10 may conduct geophysical surveys from body of water 11. Source signals may penetrate, be reflected by, and/or be refracted by stratum 230, stratum 240, target 250, and/or the interfaces therebetween. A primary electric field produced by an EM source may induce electric fields in each stratum. Each stratum may have different conductivity parameters in different directions (e.g., $\sigma_h$ and $\sigma_v$ in the diagram for horizontal and vertical conductivity parameters, respectively), which may be modeled using a background model for an EM survey. Target 250 may be a potentially anomalous region, compared to the background model. For example, in the illustrated embodiment, target 250 has lower conductivity than surrounding stratum 240, and a model of geophysical formations such as target 250 may be generated based on survey data. This may indicate potential mineral reserves in target 250.

In the illustrated embodiment, target 250 is divided into 20000 cells and each cell is 20 meters by 20 meters by 25 meters high. Thus, target 250 is 2000 meters wide in the x and y directions and 50 meters tall in the z direction in the illustrated example. In other embodiments, cells of various sizes may be implemented in surveys using various numbers of cells.

Referring now to FIG. 3A, a diagram illustrating a survey grid 300 is shown. Grid 300 may represent an overhead view of target 250. Grid cells in FIG. 3A are not drawn to size, but merely indicate the presence of a grid. In one embodiment, grid 300 includes 100 cells in the x direction and 100 cells in the y direction. Cells may be stacked, e.g., in the illustrated example there are two cells stacked in the z direction.

Referring now to FIG. 3B, a diagram illustrating exemplary survey parameters 350 is shown. In the illustrated example, sensor information indicates that sensors begin 1000 meters from a shot point (e.g., the location of the EM source) and are spaced 200 meters apart, with the last sensor placed 2800 meters from the shot point, at a depth of 100 meters. In the illustrated example, source information indicates that a source EM frequency ranges from 0.1 Hertz (Hz.). to 1 Hz. in increments of 0.25 Hz, a strength of 1 Ampere, a length of 10 meters, and a depth of zero. In the illustrated example, the target is discretized into target cells: each cell is 20×20×25 meters and 2000 cells are arranged as a 100×100×2 array. In other embodiments, any of various appropriate survey parameters may be implemented. An EM source may use different frequencies during different passes over target 250 (e.g., by vessel 10) or may generate signals with multiple different frequencies in the same pass.

Thus, in the example of FIGS. 2-3, geophysical data is generated for multiple frequencies and shot points, which may be considered two dimensions or variables of a modeling problem. Further, model parameters such as model conductivity parameters may be another dimension or variable for an inverse modeling exercise. Solving systems of equations that include model parameters as variables may generate model parameters for a model of a geophysical formation.

In one embodiment, a volume integral equation technique is used to generate a system of equations for the cells described above. The volume integral may be performed over each cell (e.g., rectangular blocks in the illustrated example) in an "anomalous" domain relative to a background model. The type of model that may be described with this method is, in some embodiments, a horizontally layered approximation of the Earth (e.g., as described by the expected or background model) which also includes this anomalous domain or target, which may describe (for example) a reservoir of any form (discretized and modeled with the "cells" in the anomaly). According to other embodiments, such anomalies may model various other things; this disclosure is not restricted to one anomaly. Thus, speaking generally, a background model and the integral equation technique may be used to generate a system of equations to solve for induced electric fields in a plurality of anomalous cells. In other embodiments, other techniques may be used to generate modeling equations in addition to or in place of the volume integral equation technique. The integral equation technique is described herein for exemplary purposes but is not intended to limit the scope of the present disclosure.

When forward modeling using EM geophysical survey data, the E field inside each cell may be solved for using the system of equations:

$$AE=f$$

where A represents the coupling between cells in the anomaly times the difference with respect to the background model and f is the electric field produced by the signal source. In this embodiment, the solution E represents the total electric field in each cell, for each s, ω and for one specific Δσ. In one embodiment, A may be a 3N×3N matrix where N is the number of cells, while E and f may be 3N×1 in size. In this example, the forward modeling exercise involves solving a system of equations in two dimensions, s and ω. The system of equations may include appropriate versions of Maxwell's equations for EM surveys.

In one embodiment, A is formed according the to the equation:

$$A=I-GS$$

where I is an identity operator, S is a diagonal matrix of Δσ components (in x, y, and z directions) and G is a matrix where each element is the integral over the cell volume for a given cell and a fixed cell (possibly the same cell), with fixed components in a Green's dyad associated with the background model. In this embodiment, G is a 3N×3N matrix where N is the number of cells (e.g., 2000 in the illustrated example). G may be 3N×3N (e.g., rather than N×N) because of the inclusion of Δσ components in three dimensions.

When performing inverse modeling, a similar set of equations may be solved, but also for numerous different model parameters (conductivity parameters in this example) for each cell:

$$A_{\omega,\Delta\sigma}E_{s,\omega,\Delta\sigma}=f_{s,\omega}$$

Thus, inverse modeling, for this example, involves solving a system of equations in three dimensions: s, ω, and Δσ.

Speaking generally, "forward modeling" involves selecting a set of model parameters and solving a system of equations to find solutions for the selected set of model parameters. "Inverse modeling" involves solving systems of equations using multiple different model parameters and determining which model parameters best fit the data.

In the integral equation method disclosed herein, one of the main computationally demanding parts in forward modeling is solving the system of linear equations. In the inverse problem, solving systems of equations becomes by far the most computational demanding part, since the other parts (e.g., G) are typically calculated only once and not for all iterations.

Seismic survey data may include similar dimensions to EM survey data such as shot points and acoustic frequencies, for example. Seismic model parameters may include porosity, permeability, and/or saturation parameters. Thus, similar techniques may be employed when modeling geophysical formations using acoustic survey data. In still other embodiments, similar techniques may be used in generating models based on various other types of survey data.

In some embodiments, a GMRES-based (generalized minimal residual method based) iterative solver is used to solve systems of equations. Generally, reducing a number of iterations of such a solver may reduce computation load, which may decrease processing time, power consumption, and/or the amount of processing power required by a computing system.

Referring now to FIG. 4, a diagram illustrating one embodiment of an exemplary solution space for an EM survey is shown. In the illustrated embodiment, solution space 400 includes solutions in three dimensions: ω (source frequency), s (shot points), and Δσ (model conductivity parameters). For example, in the illustrated embodiment, a solution at point 420 is associated with ω0, s0, and Δσ0. The following list indicates locations of other illustrated solution points in solution space 400 in this example:

| Point: | Position (ω, s, Δσ) |
|---|---|
| 402 | (ω0, s4, Δσ0) |
| 404 | (ω0, s4, Δσ2) |
| 406 | (ω0, s8, Δσ0) |
| 408 | (ω0, s8, Δσ2) |
| 412 | (ω4, s4, Δσ0) |
| 414 | (ω4, s4, Δσ2) |
| 416 | (ω4, s8, Δσ0) |
| 418 | (ω4, s8, Δσ2) |

Typically, surveys are conducted using multiple nearby frequencies and shot points, as shown by the parameters of FIG. 3B. Therefore, in one embodiment, a computing system is configured to interpolate between determined solutions for initial base points to generate solution approximations for other nearby points in the solution space. In this embodiment, the computing system may use the solution approximations as starting points for solving systems of equations to generate the nearby solutions. This may reduce a number of iterations performed before finding a solution when using GMRES-based iterative solvers, for example. Partition sizes, discussed below, related to initial base points for solutions may be adaptively adjusted in various embodiments.

Consider, for example, a forward model using model conductivity parameters $\Delta\sigma 0$. In one embodiment, a computing system determines solutions for an initial set of base points, such as points 402, 406, 412, and 416 in solution space 400. In one embodiment, determining these solutions may involve solving a system of equations, e.g., based on the AE=f formulation as discussed above. The four initial base points define a "partition" in solution space 400, which is a portion of a plane in this case. In one embodiment, the computing system is configured to interpolate between points 402, 406, 412, and 416 to generate solution approximations for other points in this partition. In one embodiment, the computing system is configured to use these solution approximations as starting points when solving systems of equations for points in the partition.

In the illustrated example, solution approximations may be generated for various points in the partition between points 402, 406, 412, and 416. These other points may include, for example points ($\omega 3$, s5, $\Delta\sigma 0$) and ($\omega 2$, s6, $\Delta\sigma 0$) among others.

"Interpolation" is a well-understood technique that involves constructing new data points (or solutions) within a range of a discrete set of known data points (or solutions). Any of various interpolation techniques may be used including linear interpolation, polynomial interpolation, multivariate interpolation, etc.

Further, consider an inverse model in the context of solution space 400. Similar techniques may be used for systems of equations that include different parameters in the $\Delta\sigma$ dimension. In the illustrated example, points 404, 408, 414, and 418 define a portion of a plane for $\Delta\sigma_2$. The eight points 402-488 define a three-dimensional partition. In various embodiments, a computing system may be configured to interpolate between initial base solutions in multiple two-dimensional partitions, one or more three-dimensional partition, and/or partitions in even higher dimensions. For example, in one embodiment, the computing system may generate solution approximations that may include approximations in the $\Delta\sigma_1$ plane as well as the $\Delta\sigma_0$ and $\Delta\sigma_2$ planes, for various $\omega$ and s in the ranges $\omega 0$-$\omega 4$ and s4-s8, by interpolating between solutions for base points 402-488. In one embodiment, the computing system is configured to use these solution approximations as starting points when solving systems of equations for points in the partition. In one embodiment, solving the solutions of equations using the starting points may include re-solving for solutions for the base points.

In the illustrated example, solution approximations may be generated for various points in the partition between points 402-418. These other points may include, for example points ($\omega 3$, s5, $\Delta\sigma 1$) and ($\omega 2$, s6, $\Delta\sigma 2$) among others. In some embodiments, these solution approximations may be used as starting points when solving associated systems of equations.

In the illustrated embodiment, the dimensions or variables include discrete values for particular frequencies, shot points, and conductivity parameters (e.g., based on survey data and selected parameters). In other embodiments, various dimensions or variables may be discrete or continuous, as appropriate, and interpolation may be performed for various points in such dimensions.

Benefits of these interpolation techniques may include shorter solving times for forward modeling problems and much more computationally efficient solution of inverse problems. When calculating the inverse, a majority of the computation time is typically spent on solving a large number of equations. Thus, the techniques disclosed herein may reduce a number of iterations performed which may in turn decrease computation time, in some embodiments. Modeling results may be used to determine locations of subterranean reservoirs, for example.

In one embodiment, once solutions have been determined for all requested points within a partition, the solution approximations may be compared to actual solutions (e.g., as provided by an iterative solver). If the difference is larger than a threshold difference, further computations may be performed using base points that are closer together (i.e., using smaller partitions). This may increase accuracy of solution approximations because solution approximations that are closer to the base points (which is the case, on average, for a smaller partition) may be more accurate. Further, if the difference is smaller than another threshold difference, the partition size may be increased. The new partition size may be used to determine solutions for other portions of the parameter space, until all requested solutions for a given requested model have been found. In one embodiment, the threshold differences or levels may be estimated (e.g., by trial and error) to provide a good tradeoff between the time to solve the base values used for interpolation and the reduction in computation time achieved by starting with solution approximations in a solver. In another embodiment, a computing system may dynamically determine the threshold level(s) based on measured computation time for one or more partitions. Speaking generally, the parameter space distance between the "base" values in the interpolation may be adaptively chosen by evaluating the efficiency of the previous step in producing the complete set of solutions in a parameter space.

Referring now to FIG. 5, a flow diagram illustrating one exemplary embodiment of a method 500 for modeling using electromagnetic survey data is shown. The method shown in FIG. 5 may be used in conjunction with any of the systems, devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, a problem is ordered in terms of shot points and frequencies. In the case of inverse modeling, the problem may also be ordered in terms of models, such as conductivity parameters or conductivity models. Flow proceeds to block 520.

At block 520, a parameter space is defined in terms of shot points and frequencies (and model parameters, in the case of inverse modeling). For example, a computing system may generate a system of equations for an electric field as a function of shot point, frequency, and model parameters. In this step, partitions are also defined in the parameter space. The partitions may be defined by base points in the parameter space, as discussed above with reference to FIG. 4, which shows solutions in a parameter space having dimensions of frequencies, shot points, and conductivity parameters. Flow proceeds to block 530.

At block 530, a computing system solves for the partition's base points to generate a set of E field solutions for the base points. In the illustrated EM example, the base points may include different points having different frequencies, shot points and/or conductivity parameters. Flow proceeds to block 540.

At block 540, the computing system interpolates to generate approximate E fields between the base values. This step may be performed as discussed above with reference to FIG. 4. Solution approximations generated by the interpolation may be generated based on relative parameter space distances between a given solution approximation and base points in the solution space. Flow proceeds to block 550.

At block 550, the computing system calculates other requested E fields between the base values using the approximated E fields as a starting solver state. Using these starting points may reduce a number of solver iterations required to determine the other requested E fields, for example. Flow proceeds to block 560.

At block 560, the partitions are updated if necessary. This may include using smaller or larger partitions for other portions of the parameter space (e.g., portions outside of the solved base points) depending on computation time taken in steps 530 and 550, for example. In one embodiment, this may be determined based on a comparison of the time taken in steps 530 and 550. In another embodiment, this may be determined by comparing interpolated E fields and calculated E fields (e.g., from steps 540 and 550) and determining whether a difference between the two is greater than a ceiling threshold or smaller than a floor threshold. Speaking generally, this may involve determining if parameter space distances between the initial set of base values was too large or too small in the context of efficient computation. Flow proceeds to block 570.

At block 570, it is determined whether partitions exist where solutions are still needed. If the result is "no," flow proceeds to block 580 and the process is done. Otherwise, flow proceeds to block 530 and further E field solutions may be determined for other partitions (which may have various sizes if updated in block 560).

Referring now to FIG. 6, a flow diagram illustrating one exemplary embodiment of a method 600 for modeling a geophysical formation is shown. The method shown in FIG. 6 may be used in conjunction with any of the systems, devices, elements, or components disclosed herein, among other devices. In various embodiments, some of the method elements shown may be performed concurrently, in a different order than shown, or may be omitted. Additional method elements may also be performed as desired. Flow begins at block 610.

At block 610, a system of equations is received that is based on a background model that describes a geophysical formation. The system of equations may be generated for multiple discrete cells according to the integral equation technique. The background model may "describe" the geophysical formation in the sense that it estimates or guesses a model for the formation, which may aid in determining a model for the formation based on actual geophysical survey data. However, the background model may or may not be based on any actual survey data from the geophysical formation. Survey data may indicate anomalous cells in a target formation relative to the background model. Flow proceeds to block 620.

At block 620, a first set of solutions is generated for the system of equations using an initial set of base points from geophysical survey data obtained from the geophysical formation. In one embodiment, for inverse modeling, the base points may also include different model parameters. Flow proceeds to block 630.

At block 630, interpolation is performed using the first set of solution approximations for a second set of data points from the geophysical survey data. The second set of data points may reside in a partition defined by the initial set of base points. Flow proceeds to block 640.

At block 640, a model is generated for the geophysical formation using the second set of data points and the second set of solution approximations. In this embodiment, the model includes a second set of solutions for the system of equations. The model may be a forward model or an inverse model, for example. In some embodiments, this step may involve using solutions with less accuracy to solve, for each data point, an associated system of equations. This step may be performed using a GMRES-based iterative solver, for example. Parameter space distances between base points for subsequent calculations may be adjusted, e.g., based on a comparison of the solution approximations and the generated second set of solutions. Flow ends at block 640.

In some embodiments, a geophysical data product may be produced. The geophysical data product may include processed geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method, comprising:
    a computing system receiving a system of equations based on a background model, wherein the background model describes a geophysical formation;
    the computing system generating a first set of solutions for the system of equations using an initial set of base points from geophysical survey data obtained from the geophysical formation;
    the computing system interpolating, using the first set of solutions, to produce a set of solution approximations for a second set of data points from the geophysical survey data; and
    the computing system generating a model of the geophysical formation, using the second set of data points and the set of solution approximations, wherein the model includes a second set of solutions for the system of equations.

2. The method of claim 1, further comprising:
determining that a difference between the second set of solutions and the set of solution approximations is greater than a threshold difference; and
based at least in part on the determining, adjusting a parameter space distance between another initial set of base points from the geophysical survey data.

3. The method of claim 1, wherein the system of equations has a plurality of variables including shot points and source frequencies.

4. The method of claim 1, wherein the system of equations has a plurality of variables including model parameters, and wherein generating the second set of solutions is associated with generating an inversion model.

5. The method of claim 4, wherein the model parameters are selected from the group consisting of: conductivity parameters, porosity parameters, permeability parameters, and saturation parameters.

6. The method of claim 1, wherein the geographical survey data is generated by one or more survey types selected from the group consisting of: a seismic geophysical survey, an electromagnetic survey, a seismoelectric survey, and a gravity survey.

7. The method of claim 1, further comprising:
adjusting a parameter space distance between initial base points based at least in part on computation time taken to generate the second set of solutions.

8. A non-transitory computer-readable storage medium having instructions stored thereon that are executable by a computing device to perform operations comprising:
receiving a system of equations that describe a geophysical formation, wherein the system of equations has a plurality of dimensions;
generating a first set of solutions for the system of equations using a set of base points from geophysical survey data obtained from the geophysical formation;
interpolating, using the first set of solutions, to produce a set of solution approximations for a second set of data points from the geophysical survey data; and
generating a second set of solutions for the system of equations using the second set of data points and the set of solution approximations.

9. The non-transitory computer-readable storage medium of claim 8, wherein the operations further comprise:
determining that a difference between the second set of solutions and the set of solution approximations is greater than a threshold difference; and
selecting, in response to the determining, another set of base points that are closer to each other in at least one dimension than the set of base points.

10. The non-transitory computer-readable storage medium of claim 9, wherein the operations further comprise:
determining the threshold difference based on computation time taken to generate the first set of solutions and computation time taken to generate the second set of solutions using the set of solution approximations.

11. The non-transitory computer-readable storage medium of claim 9, wherein the another set of base points defines a smaller partition that does not overlap with a partition defined by the set of base points.

12. The non-transitory computer-readable storage medium of claim 8, wherein the geophysical survey data has a plurality of dimensions including shot points and source frequencies.

13. The non-transitory computer-readable storage medium of claim 8, wherein the system of equations has a plurality of dimensions, wherein one of the plurality of dimensions is a model parameter, and wherein two or more base points of the set of base points have different model parameters.

14. The non-transitory computer-readable storage medium of claim 13, wherein the model parameters are conductivity parameters.

15. The non-transitory computer-readable storage medium of claim 8, wherein the geophysical survey data includes data generated by an electromagnetic geophysical survey.

16. The non-transitory computer-readable storage medium of claim 8, wherein one of the set of base points is a same data point as one of the second set of data points.

17. The non-transitory computer-readable storage medium of claim 8, wherein the system of equations is based on an integral equation technique and wherein the base points lie within an anomalous portion of the geophysical formation relative to a background model.

18. A method of geophysical data processing, comprising:
obtaining geophysical data specific to a subsurface geophysical formation;
a computing system determining a plurality of model parameters for a model of the subsurface geophysical formation;
the computing system solving a system of equations using a set of initial base points from the geophysical data, wherein the set of initial base points includes points with different shot points and different model parameters, wherein the solving generates a first set of solutions;
the computing system interpolating between the first set of solutions to produce a set of solution approximations for a second set of points from the geophysical data; and
the computing system generating a model of the subsurface geophysical formation, using the second set of data points and the set of solution approximations, wherein the model includes a second set of solutions for the system of equations.

19. The method of claim 18, wherein obtaining geophysical data comprises at least one of conducting a geophysical survey or accessing data from a geophysical survey.

20. The method of claim 18, wherein the interpolating includes interpolating in a plurality of dimensions in a solution space having at least two dimensions.

21. A method of generating a geophysical data product, the method comprising:
a computing system receiving a system of equations based on a background model, wherein the background model describes a geophysical formation;
the computing system generating a first set of solutions for the system of equations using an initial set of base points from geophysical survey data obtained from the geophysical formation;
the computing system interpolating, using the first set of solutions, to produce a set of solution approximations for a second set of data points from the geophysical survey data;
the computing system generating a model of the geophysical formation . . . for the system of equations; and
the computing system recording the geophysical data product on a tangible, non-volatile computer-readable medium suitable for importing onshore, wherein the geophysical data product includes data specifying the generated model.

22. The method of claim 21, further comprising performing geophysical analysis onshore on the data product.

* * * * *